Figure 1:
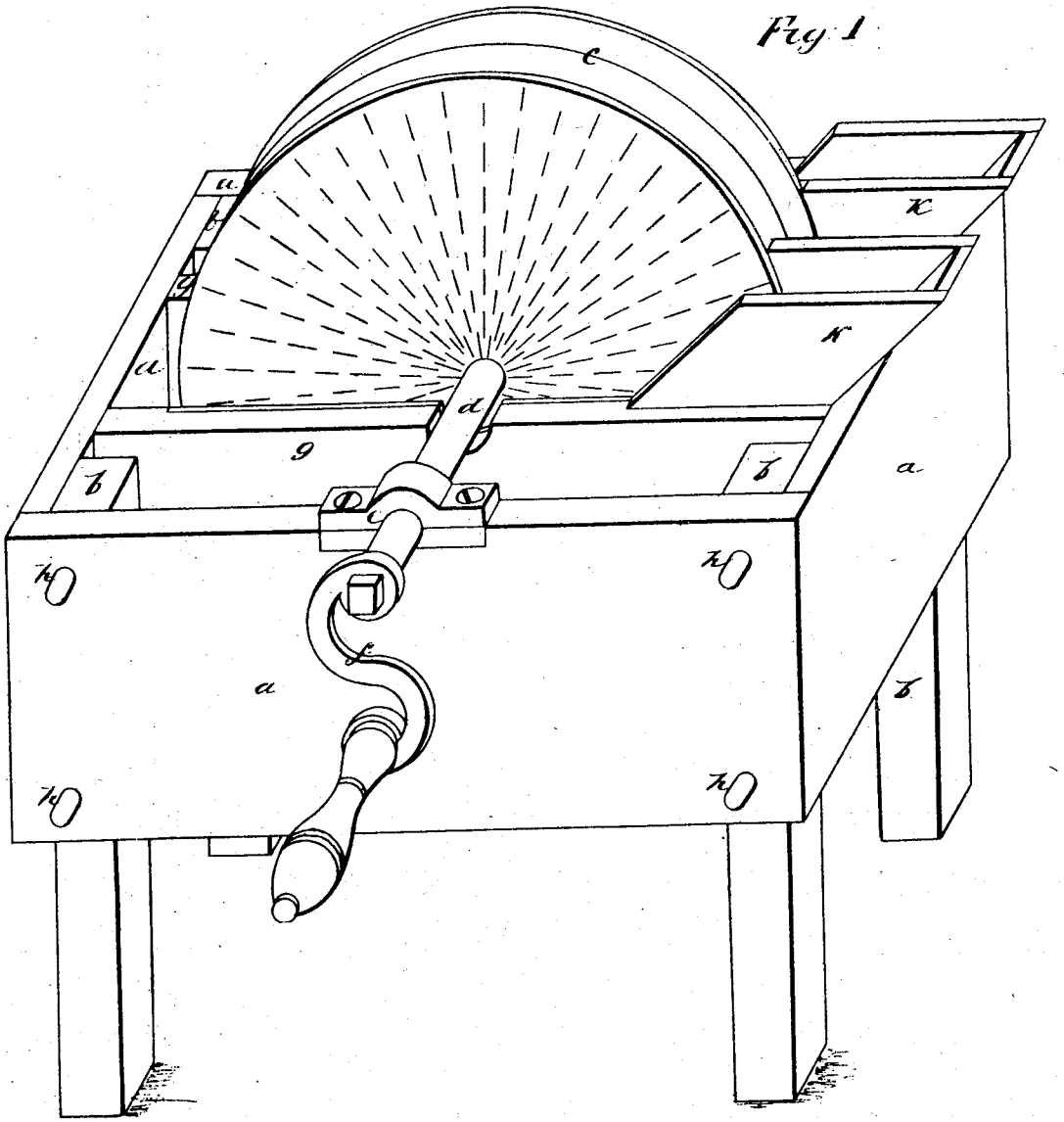

4238X

Sheet 1 - 2 Sheets.

A. Bailey.

Corn Sheller.

Patented Nov. 1, 1825.

4238X
Sheet 2-2 Sheets.
A. Bailey.
Corn Sheller.
Patented Nov. 1, 1825.
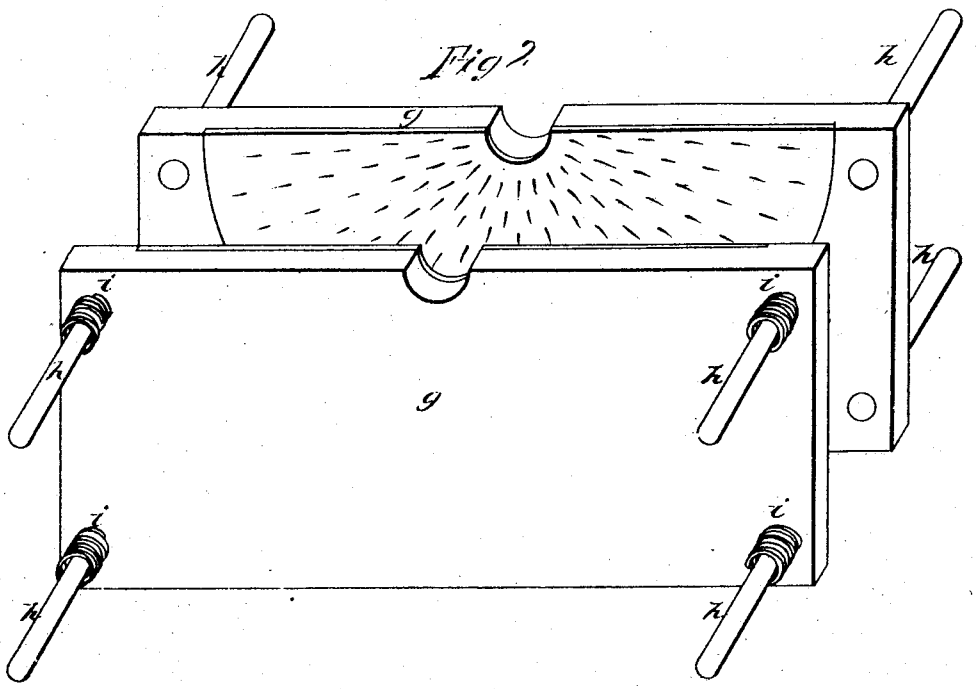

United States Patent Office

PTO - BOYERS, PA Duty Station

MISSING PAGE TEMPORARY NOTICE

PATENT # 4238X FOR ISSUE DATE 11-1-1825

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text

Data Conversion Operation

Boyers, Pa